United States Patent [19]

Azvedo

[11] Patent Number: 4,888,968
[45] Date of Patent: Dec. 26, 1989

[54] AIRCRAFT THEFT GUARD

[76] Inventor: Frank D. Azvedo, Elk Grove, Calif.

[21] Appl. No.: 290,297

[22] Filed: Dec. 27, 1988

[51] Int. Cl.$^4$ .............................................. B65D 55/14
[52] U.S. Cl. .......................................... 70/163; 70/57;
70/167; 70/212; 180/90; 244/224
[58] Field of Search ...................... 70/57, 58, 158, 163,
70/164, 166–168, 258; 180/90; 244/224

[56] References Cited

U.S. PATENT DOCUMENTS

| | | | |
|---|---|---|---|
| 3,169,731 | 2/1965 | Phillips et al. | 244/224 |
| 3,583,519 | 6/1971 | Meyer | 180/90 |
| 3,643,478 | 2/1972 | McPeake | 70/212 |
| 3,814,205 | 6/1974 | Miller | 180/90 |
| 3,898,823 | 8/1975 | Ludeman | 244/224 X |
| 4,041,738 | 8/1977 | Vann | 70/212 |
| 4,131,173 | 12/1978 | Boersma | 180/90 |
| 4,228,974 | 10/1980 | Yates | 244/224 |
| 4,299,361 | 11/1981 | Webb | 244/224 |
| 4,475,366 | 10/1984 | Marneris | 70/258 |
| 4,549,625 | 10/1985 | Tindall | 180/90 |

Primary Examiner—Gary L. Smith
Assistant Examiner—Suzanne L. Dino
Attorney, Agent, or Firm—Melvin R. Stidham

[57] ABSTRACT

A shield of rigid sheet metal is of a size and shape to substantially cover the instrument panel of an aircraft. A pair of shrouds on the bottom of the shield are spaced so that each fits over one of the control columns of the aircraft, and aligned holes in each shroud are adapted to receive a padlock to lock the shield in place. The shrouds are of a length to fit closely over the control columns when fully extended to prevent any significant movement of the control colum axially and pins, which are secured to the shield, extent through openings in the control columns to prevent any accidental or unauthorized turning. A cylindrical housing open at one end is received over the throttle control, and a lock stem extending vertically from the housing is received in a tube, which is fixed to the shield, when the shield is possitioned on the instrument panel so that there can be no manipulation of the throttle.

7 Claims, 2 Drawing Sheets

AIRCRAFT THEFT GUARD

BACKGROUND OF THE INVENTION

This invention relates to an aircraft theft guard and, more particularly, to a device for securing an aircraft against unauthorized flight and for protecting valuable instrumentation, including radios and navigational equipment, which are mounted in the instrument panel of an aircraft.

It is common practice to park private aircrafts on an airfield between flights and, when not in use, the aircrafts are frequently tied down in a remote location on the field, away from close observation. Such aircrafts are often easily entered and it is extremely difficult to prevent unauthorized flight and theft of the aircraft. Moreover, such aircraft are often equipped with valuable electronic equipment such as radios and navigational equipment, which are easily removed from the instrument panel as needed for repair and replacement. Unfortunately, such equipment is just as easily removed by unauthorized persons and such thefts are becoming an increasing problem when the aircraft may be left unattended, even for a brief period.

An invention in partial solution of this problem is illustrated and described in U.S. Pat. No. 4,475,366, granted to Michael Marneris on Oct. 9, 1984 for "Protective Device for Instruments Mounted on an Instrument Panel." It shows a cover plate of aluminum or the like which is positioned by dropping a pair of shrouds over the control columns of the aircraft and securing them in place by a locking bar extended across the shrouds. The shrouds may be positioned to cover rods which are carried on locking pins provided on some aircraft to prevent movement of the control column and, hence, undesirable movement of aeronautical control surfaces while the aircraft is parked. However, the positioning shrouds allow considerable movement and bending of the control cover, often enabling sufficient displacement to permit theft of instruments or in any event, damage to the steering column, the instrument panel and the instruments themselves. Moreover, where control column locking pins are not provided on the aircraft, as above described, there is really no provision in the protective device itself for preventing movements of the control columns and movements of the aircraft control surfaces.

Corrado U.S. Pat. No. 3,699,787 granted Oct. 24, 1972 for "Cover Means for Navigational Instruments and Radio Equipment Mounted on Panel of Aircraft" shows a cover for instruments and equipment on the instrument panel, but it is not sufficiently rugged to deter a determined thief, and theft of the aircraft itself was apparently not a principal concern of the patentee.

OBJECTS OF THE INVENTION

It is an object of this invention to provide an aircraft theft guard having unitary means for preventing axial movement of the control column or tube.

It is a further object of this invention to provide an aircraft theft guard having unitary means thereon to prevent both axial and rotational movements of the flight control tube.

It is a further object to provide an aircraft theft guard which prevents operation of the throttle control.

It is a further object of this invention to provide an aircraft theft guard forming a shield to prevent removal of instruments from the instrument panel.

It is a further object of this invention to provide an aircraft theft guard conditioned to protect the instrument panel against damage, theft and the sun's rays.

It is a further object of this invention to provide an aircraft theft guard that is rigid and unbendable and which may be locked in place against any significant movement.

Further objects and advantages of this invention will become apparent from the description to follow, particularly when read in conjunction with the accompanying drawings.

DESCRIPTION OF PREFERRED EMBODIMENTS

The Embodiment of FIGS. 1, 2, 4 and 5

Figure 1:
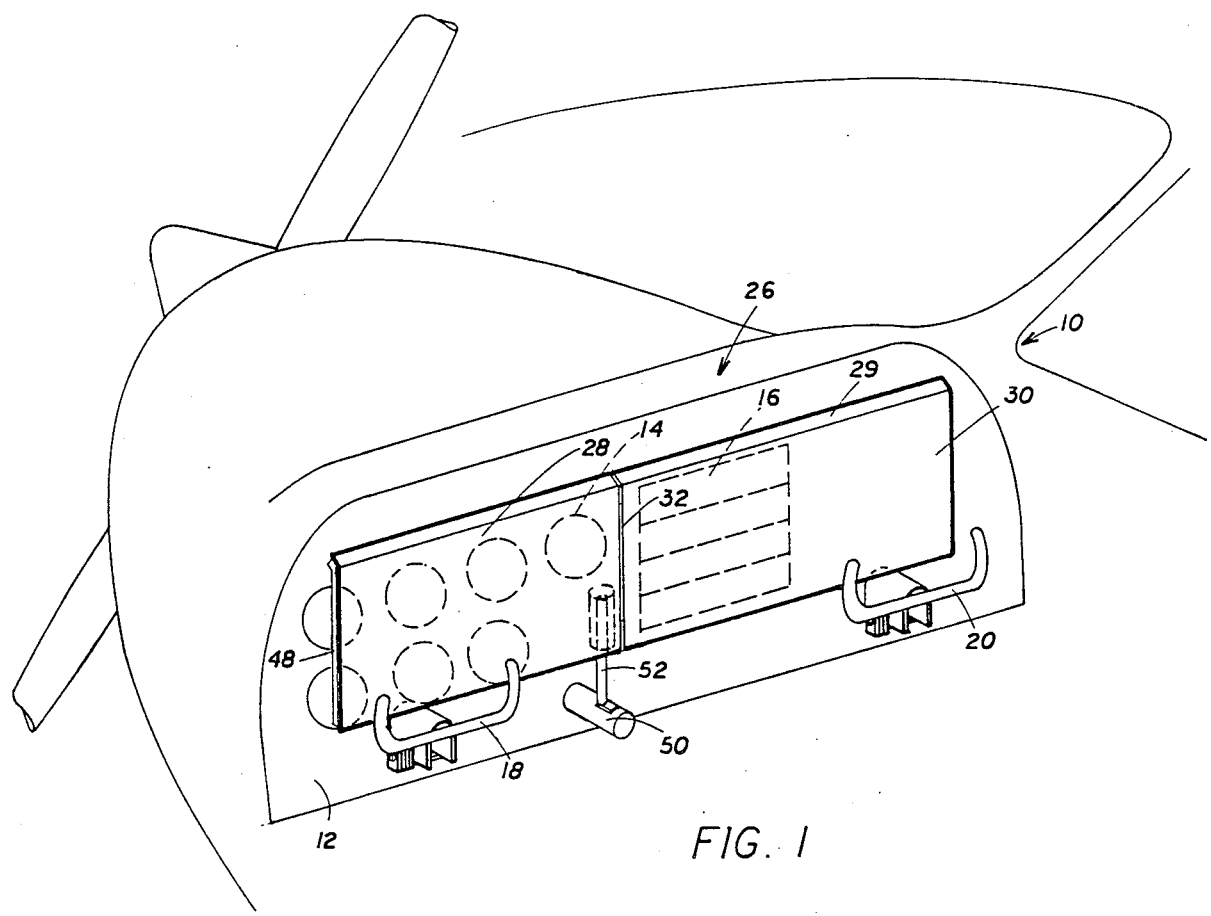
FIG. 1 is a view in perspective of a portion of an aircraft cockpit with the aircraft theft guard of this invention in place.
Figure 2:
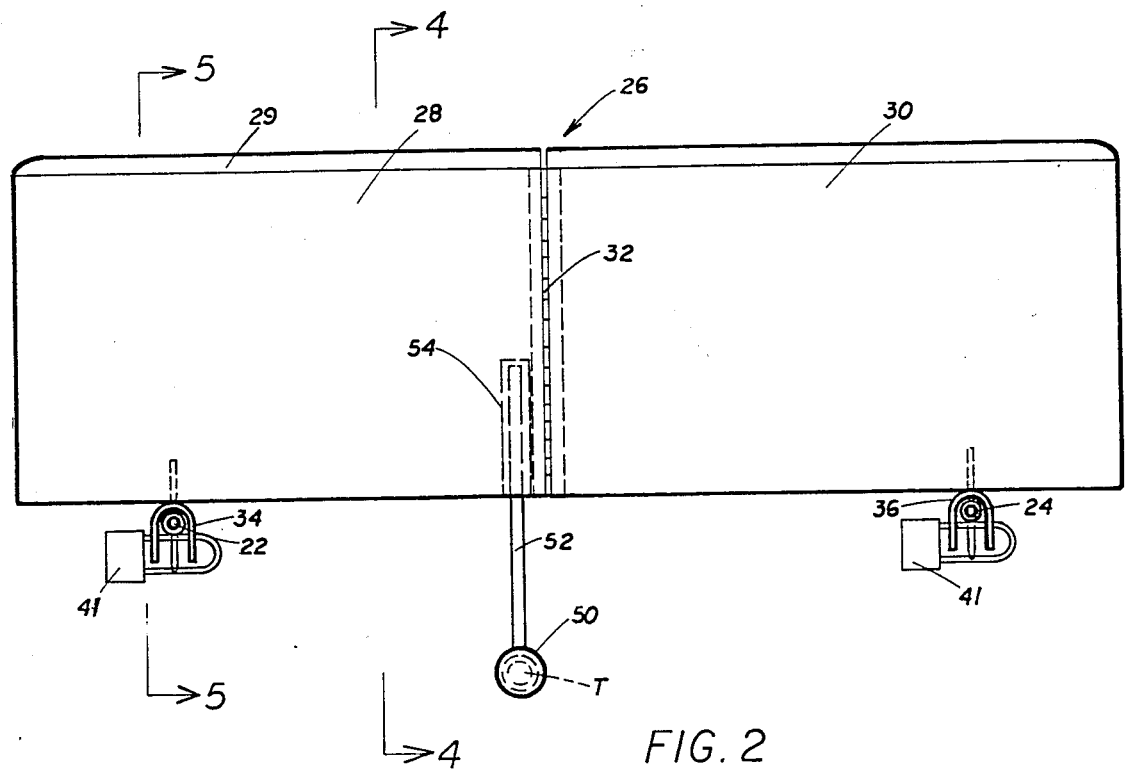
FIG. 2 is an elevation view of the aircraft theft guard.

Referring now to FIGS. 1 and 2 with greater particularity, there is shown a small aircraft cockpit 10 with an instrument panel 12, in which are mounted instrument gauges 14, as well as electronic navigational and communication equipment 16. The aircraft also includes conventional control wheels or yokes 18 and 20 carried on control columns or tubes 22 and 24 (FIG. 2).

As is conventional, the control columns 22 and 24 may be rotated clockwise or counterclockwise to operate the ailerons, and they may be pushed or pulled axially, in or out, to operate the elevators.

The aircraft theft guard 26 of this invention comprises a pair of relatively rigid panels 28 and 30, preferably of a suitable sheet metal, such as stainless steel of sufficient thickness to resist bending, breaking or tearing. I have found that a twelve gauge sheet stainless steel is satisfactory for this purpose, such material being virtually impenetrable by ordinary hand tools. The panels 28 and 30 are joined by a hinge 32. In order to increase rigidity, the panels are preferably bent back along their top edges 29 at approximately a 45° angle.

Welded or otherwise rigidly secured to the lower edges of the panels 28 and 30 are inverted U-shaped shrouds 34 and 35, which are spaced to fit over the control columns 22 and 24, as shown clearly in FIG. 2. Each of the shrouds 34 and 36 has aligned openings 38 to receive a padlock 41. The shrouds 34 and 36 are of a length that, with the control columns 22 and 24 fully withdrawn or extended, the shrouds will fit down over the columns 22 and 24 with little clearance between the instrument panel 12 and the steering yokes 18 and 20. The shrouds 34 and 36, therefore, prevent any significant axial movement of the columns and, hence, prevent any inadvertent or unauthorized movement of the elevators. In addition, welded to bracket plates 40 and 42 on the backs of the panels 28 and 30 are lock pins 44 and 46 which engage through holes in the control columns 22 and 24 to prevent rotation thereof. Hence, on aircraft provided with such holes in the steering columns, the theft guard 26 of this invention prevent inadvertent or wind-aided operation of the ailerons, as well as the elevators.

Figure 4:
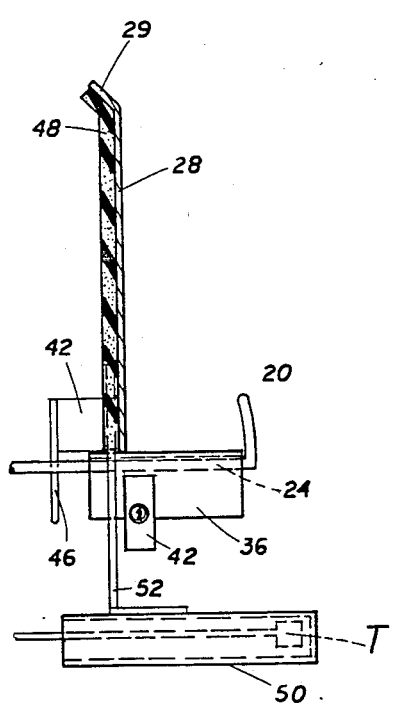
FIG. 4 is a section view taken along line 4—4 of FIG. 2.
Figure 5:
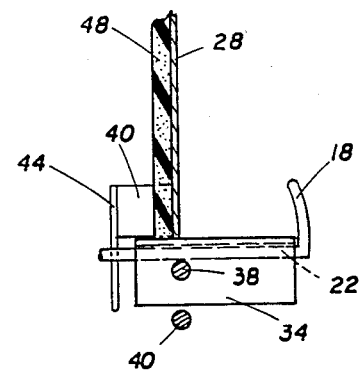
FIG. 5 is a partial section view taken along line 5—5 of FIG. 2.

The U-shaped shrouds 34 and 36 are formed to fit snugly around the control columns 22 and 24 so that there can be little or no movement of the panels 28 and 30 to provide access to the instruction 16, or to allow leverage for bending of the panels 28 and 30. Movement of the panels 28 and 30 is further limited by positioning the padlock holes 38 closely below the control tubes 22 and 24. In addition, the panels 28 and 30 cover the electronic navigational and communication equipment 16 to prevent unauthorized removal thereof. As shown in FIGS. 4 and 5, the panels 28 and 30 are lined with a resilient material, such as foam rubber to protect the instrument panel 12 from impacts and scratches as well as from the deleterious effects of the hot sun. The hinge 32 is preferably off center so that when not in use, the theft guard 26 may be folded without interference between the shrouds 22 and 24.

On a small aircraft that has a hand throttle control T (FIGS. 2 and 4) that is pulled out for speed control, I provide a cylindrical housing 50, which is received over the throttle control T. A stem 52, which is welded to the cylindrical housing 50 extends up in front of the instrument panel 12 so that when the aircraft theft guard 26 is placed over the instrument panel, the stem 52 is received in a tube 54 welded to the back of the panel 28. This prevents any movement of the throttle and, as a result, when the aircraft theft guard 26 is in place and secured by locks 40 and 42, the speed, lift and directional control systems are all inoperative, and the aircraft is completely immobilized, and locked against mobilization. Hence, the pilot or copilot can protect his aircraft as well as valuable instrumentation by unfolding and mounting the aircraft theft guard 26 in just a few seconds without leaving his seat in the cockpit. When not in use the aircraft theft guard can be folded and easily stored. Although the panel is of rugged twelve guage stainless steel, it weighs less than four pounds for most small aircraft.

Figure 3:
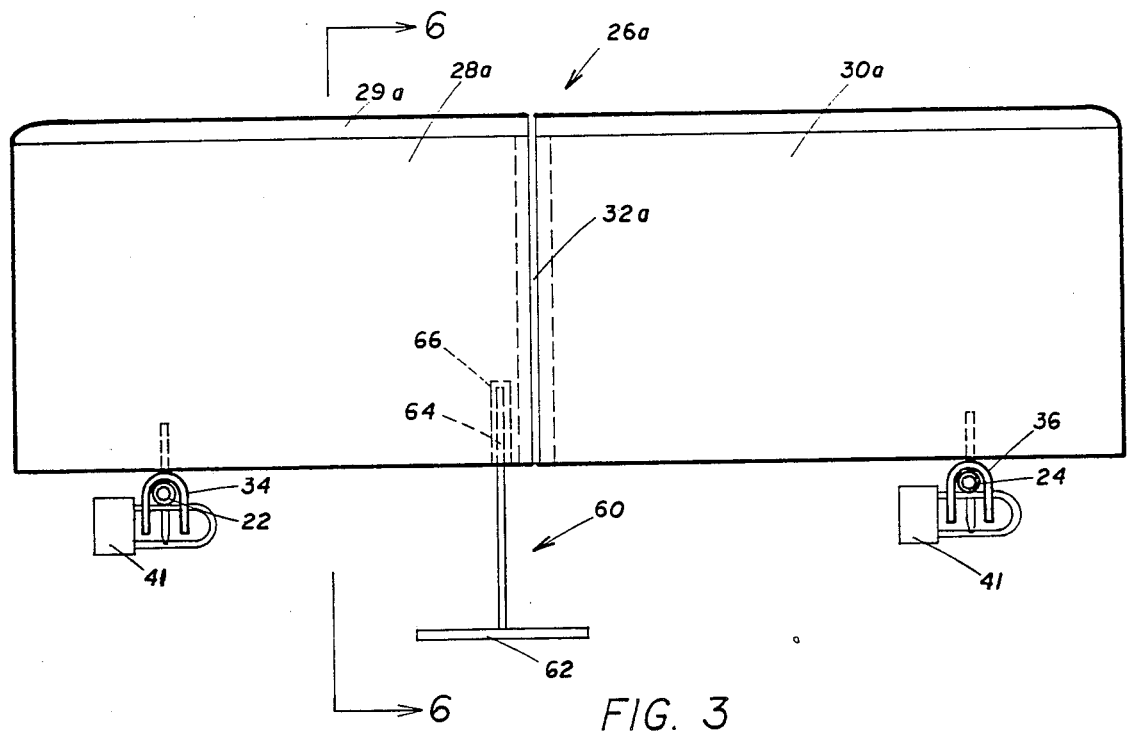
FIG. 3 is an elevation view of another embodiment of my aircraft theft guard invention.
Figure 6:
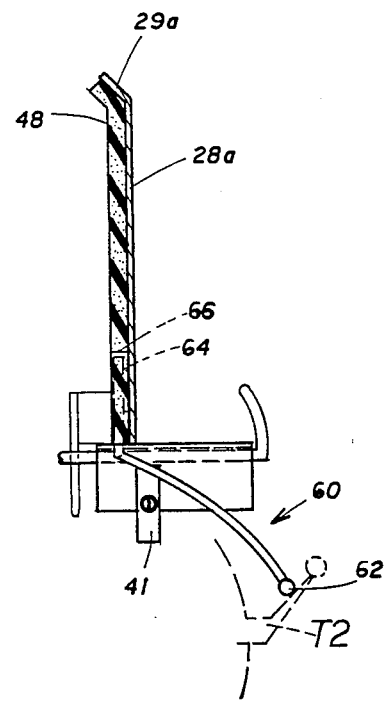
FIG. 6 is a section view taken along line 6—6 of FIG. 3.

The embodiments of FIGS. 3 and 6

On some aircraft, the throttle control T2 (FIG. 6) is in the form of a lever which is pivoted forwardly to increase aircraft speed. For such aircraft, I provide the throttle lock shown in FIGS. 3 and 6 wherein a T-bar 62 having an upstanding stem 64 is supported on the fully retracted throttle lever so that a vertical portion of the stem is received in a tube 66, which is welded to the back of the panel 28a. With the aircraft theft guard 26a locked in place with padlocks 40 and 42, the throttle control T2 cannot be moved forward and, again, the flight controls are disabled.

While this invention has been described in conjunction with preferred embodiments thereof, it is obvious that modifications and changes therein may be made by those skilled in the art to which it pertains without departing from the spirit and scope of this invention, as defined by the claims appended hereto.

What is claimed as invention is:

1. An aircraft theft guard comprising:
   a shield of rigid sheet metal adapted to substantially cover the instrument panel of an aircraft;
   means for locking said shield to the control columns of said aircraft to prevent removal thereof from said instrument panel;
   means on said shield to block axial movements of said control columns;
   means on said shield to prevent rotary movements of said control columns; and
   means on said shield to prevent control movements of the throttle control of said aircraft.

2. The aircraft theft guard defined by claim 1 including:
   a pair of U-shaped shrouds positioned to be received over said control columns;
   aligned openings in the legs of each of said shrouds;
   said aligned openings being adapted to receive a padlock to lock said shield to the control columns; and
   said shrouds being of a length to be closely received on said control columns when said control columns are fully extended.

3. The aircraft theft guard defined by claim 1 wherein:
   said means for preventing rotary movements of said control columns comprises:
   vertical pins fixed to said shield in alignment with said shrouds, each to be received through a hole through one of said control columns.

4. An aircraft theft guard comprising:
   a shield of rigid sheet metal adapted to substantially cover the instrument panel of an aircraft;
   means for locking said shield to the control columns of said aircraft to prevent removal thereof from said instrument panel;
   means on said shield to block axial movements of said control columns;
   means on said shield to prevent rotary movements of said control columns;
   means for blocking movement of the throttle control of said aircraft
   a vertical pin fixed to said throttle blocking means; and
   a vertical sleeve secured to said shield to receive said vertical pin.

5. The aircraft theft guard defined by claim 4 including:
   a pair of U-shaped shrouds positioned to be received over said control columns;
   aligned openings in the legs of each of said shrouds;
   said aligned openings being adapted to receive a padlock to lock said shield to the control columns; and
   said shrouds being of a length to be closely received on said control columns when said control columns are fully extended.

6. The aircraft theft guard defined by claim 4 wherein:
   said means for preventing rotary movements of said control columns comprises:
   vertical pins fixed to said shield in alignment with said shrouds, each to be received through a hole through one of said control columns.

7. An aircraft theft guard comprising:
   a shield of rigid sheet metal adapted to substantially cover the instrument panel of an aircraft;
   means for locking said shield to the control columns of said aircraft to prevent removal thereof from said instrument panel;
   means on said shield to block axial movements of said control columns; and
   means on said shield to prevent control movements of the throttle control of said aircraft.

* * * * *